(12) United States Patent
Al-Shannag et al.

(10) Patent No.: US 9,127,457 B2
(45) Date of Patent: Sep. 8, 2015

(54) MACHINE FOR DEFORMING AND CUTTING PLASTIC STRIPS FOR ENHANCING CONCRETE

(75) Inventors: Mohammad J. M. Al-Shannag, Riyadh (SA); Abdulrahman M. Alhozaimy, Riyadh (SA)

(73) Assignee: King Saud University, Riyadh (SA)

( * ) Notice: Subject to any disclaimer, the term of this patent is extended or adjusted under 35 U.S.C. 154(b) by 235 days.

(21) Appl. No.: 13/545,254

(22) Filed: Jul. 10, 2012

(65) Prior Publication Data

US 2014/0013692 A1    Jan. 16, 2014

(51) Int. Cl.

| B28B 11/14 | (2006.01) |
|---|---|
| E04C 5/07 | (2006.01) |
| B29C 59/04 | (2006.01) |
| B29C 47/88 | (2006.01) |
| B29C 47/92 | (2006.01) |
| B29C 43/46 | (2006.01) |
| B28C 5/40 | (2006.01) |

(52) U.S. Cl.
CPC ............ *E04C 5/073* (2013.01); *B28C 5/404* (2013.01); *B29C 47/8805* (2013.01); *B29C 47/92* (2013.01); *B29C 59/04* (2013.01); *B29C 2043/463* (2013.01); *B29C 2043/464* (2013.01)

(58) Field of Classification Search
CPC ...... B29C 59/02; B29C 59/04; B29C 59/022; B29C 2043/463; B29C 2043/464; B29C 47/88; B29C 47/8805; B29C 47/881; B29C 47/90; B29C 47/92; B29B 9/06; B26D 9/00; B26D 11/00; B26D 2011/005; E04C 5/073; B28C 5/404

USPC .............. 425/299, 302.1, 303, 304, 307, 311, 425/217, 140, 141, 142, 382 R, 382.2, 425/382 N, 363, 369, 373, 374, 383, 385, 425/396

See application file for complete search history.

(56) References Cited

U.S. PATENT DOCUMENTS

| 3,076,999 | A | * | 2/1963 | Washburn | 425/316 |
|---|---|---|---|---|---|
| 3,394,206 | A | * | 7/1968 | Light et al. | 264/40.1 |
| 3,765,811 | A | * | 10/1973 | Sawada | 425/113 |
| 3,771,932 | A | * | 11/1973 | Van Daal | 425/296 |
| 3,843,758 | A | * | 10/1974 | Maroschak | 264/40.7 |
| 3,990,827 | A | * | 11/1976 | Maroschak | 425/150 |
| 4,042,175 | A |   | 8/1977 | Johnson | |
| 4,088,721 | A | * | 5/1978 | Apicella, Jr. | 264/40.4 |
| 4,097,566 | A | * | 6/1978 | Bertin et al. | 264/40.7 |
| 4,233,255 | A | * | 11/1980 | Moon | 264/40.4 |

(Continued)

FOREIGN PATENT DOCUMENTS

| DE | 4025379 A1 | 2/1992 |
|---|---|---|
| JP | 52008583 A | 1/1977 |

(Continued)

*Primary Examiner* — Seyed Masoud Malekzadeh
(74) *Attorney, Agent, or Firm* — Lowe Hauptman & Ham, LLP

(57) ABSTRACT

A machine for deforming and cutting plastic strands of recycled plastic for use as a secondary reinforcement in concrete includes a multi-strand supply of recycled plastic and a mechanism for advancing the multi-strands into and through the machine. The advancing mechanism may be several sets of motor driven roller sets each of which is connected to a common motor by a belt. The machine includes three sets of deformation mechanisms, a heater for softening the deformed strands and a cutter powered by a separate motor for cutting the softened plastic strands.

5 Claims, 2 Drawing Sheets

(56) References Cited

U.S. PATENT DOCUMENTS

| | | | |
|---|---|---|---|
| 4,247,270 A * | 1/1981 | Schubert | 425/66 |
| 4,340,342 A * | 7/1982 | Kim | 425/72.1 |
| 4,468,186 A * | 8/1984 | Sollich | 425/294 |
| 4,655,111 A | 4/1987 | Blaker et al. | |
| 4,865,796 A * | 9/1989 | Tamura et al. | 264/40.7 |
| 4,906,170 A * | 3/1990 | Nelson et al. | 425/94 |
| 5,094,790 A * | 3/1992 | Halter | 264/40.5 |
| 5,163,348 A | 11/1992 | Kitada et al. | |
| 5,267,845 A * | 12/1993 | Anderlind et al. | 425/71 |
| 5,354,524 A * | 10/1994 | Sellars et al. | 264/37.2 |
| 5,419,695 A * | 5/1995 | Clegg | 425/296 |
| 5,507,983 A * | 4/1996 | Sellars et al. | 264/37.2 |
| 5,878,464 A | 3/1999 | White | |
| 5,935,291 A * | 8/1999 | Kim et al. | 65/495 |
| 6,210,143 B1 * | 4/2001 | Takagi et al. | 425/142 |
| 6,401,581 B1 | 6/2002 | Sand | |
| 7,077,640 B2 * | 7/2006 | Hashimoto et al. | 425/296 |
| 7,832,315 B2 | 11/2010 | Bascom et al. | |
| 8,246,876 B2 * | 8/2012 | Koehler | 264/143 |
| 8,585,389 B2 * | 11/2013 | Grashuis et al. | 425/113 |
| 2001/0015508 A1 * | 8/2001 | Schafer et al. | 264/101 |
| 2003/0006535 A1 * | 1/2003 | Hennessey et al. | 264/403 |
| 2006/0057243 A1 * | 3/2006 | Hayashi et al. | 425/363 |
| 2008/0095874 A1 * | 4/2008 | Diekhaus et al. | 425/72.1 |
| 2009/0212456 A1 * | 8/2009 | Smale | 264/157 |

FOREIGN PATENT DOCUMENTS

| | | |
|---|---|---|
| JP | 55042261 A | 3/1980 |
| JP | 63105119 A | 5/1988 |
| JP | 04059644 A | 2/1992 |
| JP | 07309650 A | 11/1995 |

* cited by examiner

MACHINE FOR DEFORMING AND CUTTING PLASTIC STRIPS FOR ENHANCING CONCRETE

FIELD OF THE INVENTION

This invention relates to a machine for deforming and cutting plastic fibers or strands into different lengths for enhancing the performance of concrete and more particularly to a machine for deforming, heating recycled plastic strands and subsequently cutting the deformed and heated strands into preselected lengths.

BACKGROUND FOR THE INVENTION

Concrete is a tension-weak building material which often cracks under low load levels of tensile stress. The cracks generally develop with time and stresses to penetrate the concrete to destructive substances. It has been recognized that the behavior of concrete can be improved by reinforcing it with discontinuous fibers. The concrete reinforcing fibers include metal, polymer, glass, carbon etc.

Among the polymer fibers the polypropylene fibers have become popular in recent years due to their effectiveness in reducing cracking at early ages under the effects of restrained plastic shrinkage, easy handling and lower costs compared to other types. Plastic shrinkage cracks are most common on horizontal surfaces of pavements and slabs where rapid evaporation occurs and its occurrence destroys the integrity of the surface and reduces its durability.

An increasing amount of plastic waste is a worldwide problem which has led to requirements for its recycling and reuse of such materials. For example, polyethylene terephthalate (PET) is a thermoplastic polymer resin of the polyester family commonly used to make PET bottles used as beverage containers. Such containers are thrown away after a single use and disposed bottles are managed by landfill and incineration which cause environmental problems. Therefore, recycling holds promise for returning the waste into service and promotes the use of such materials in construction.

The development of new construction materials using recycled plastic is important to both the construction and plastic industries. This has led to an increase interest in the use of recycled plastic fibers or strands as a secondary reinforcement in concrete since they are generally considered to be non-biodegradable and may not need to be purified and separated to the same extent as recycled plastic used in other applications. Therefore, manufacturing recycled plastic fibers or strands from industrial or post-consumer waste should offer effective reinforcement of concrete and an additional advantage of waste reduction and resource conservation.

SUMMARY OF THE INVENTION

It is presently believed that the use of the present invention can lead to a large scale production of deformed recycled plastic strands or fibers with improved surface bond characteristics and enhanced performance as a low cost reinforcement for concrete. Further, the deformed plastic strands will serve the following purposes. For example, 1) it can effectively improve the shrinkage, toughness and durability characteristics of concrete improved over smooth plastic fibers commercially available in the market and, 2) reduce the cost of solid waste disposal as land-fill areas are rapidly being depleted and incineration causes pollution to the air.

In essence, the invention contemplates a machine for the deformation and cutting of recycled plastic strands or fibers as a secondary reinforcement in concrete. The machine comprises and/or consists of a multi-strand supply of recycled plastic strands and means for advancing the multi-strands into and through the machine. The advancing means may be a set of motor driven rollers. The machine also includes a first deformation means for deforming a strand or a plurality of strands and second deformation means for further deformation of the recycled plastic strands. Following the deformation means, the machine includes a heater for softening the plastic strands and a cutter for cutting softened deformed plastic strands. A speed control mechanism allows the fibers to be cut at different lengths.

The invention also contemplates a concrete structure comprising or consisting of cement, sand, aggregate and water (the concrete), and may include longitudinally extending steel bars as a primary reinforcement and fibers as a secondary reinforcement. In the present invention the secondary reinforcement comprises or consists of deformed recycled plastic strands in different lengths.

The invention will now be described in connection with the accompanying figures wherein like numbers are used to identify like parts.

DESCRIPTION OF THE PREFERRED EMBODIMENTS OF THE INVENTION

A machine for the deformation and cutting of recycled plastic strands for enhancing concrete will now be described in connection with FIGS. 1 and 2. As shown a machine 20 is designed to operate with rough and smooth molded rollers and belts for pulling and connecting recycled plastic strands through specially designed guides leading to a cutter 30. The rotation of the roller sets depend on bearings that allow easy rotation of roller sets 47/48, 49/51, 53/54 and 55/56. Each roller set includes a relatively smooth upper roller 48, 51, 54 and 56 and a relatively rough lower roller 47, 49, 53 and 55. The relatively rough rollers may be separately driven and provide traction to propel the strands into and through the machine 20.

The rollers may be mounted on roller bearing sets that allow easy rotation with spools commonly connected by belts. The machine also incorporates thermostatic heated rollers 57/58 to soften the plastic strands before the cutter 30. This heater reduces the energy required for the cutter of multiple strands of recycled plastic.

Figure 1:
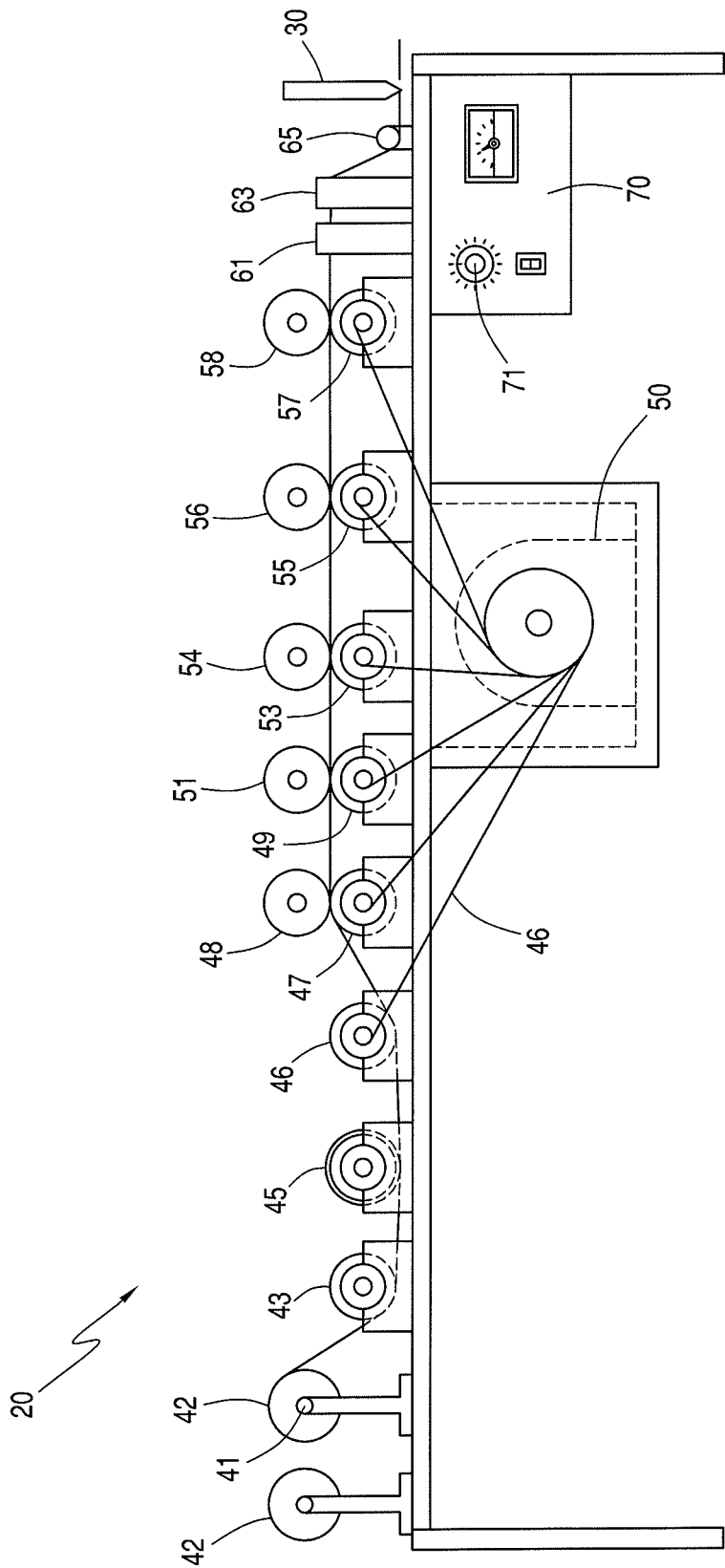
FIG. 1 is a schematic illustration of a machine in accordance with a first embodiment of the invention.
Figure 2:
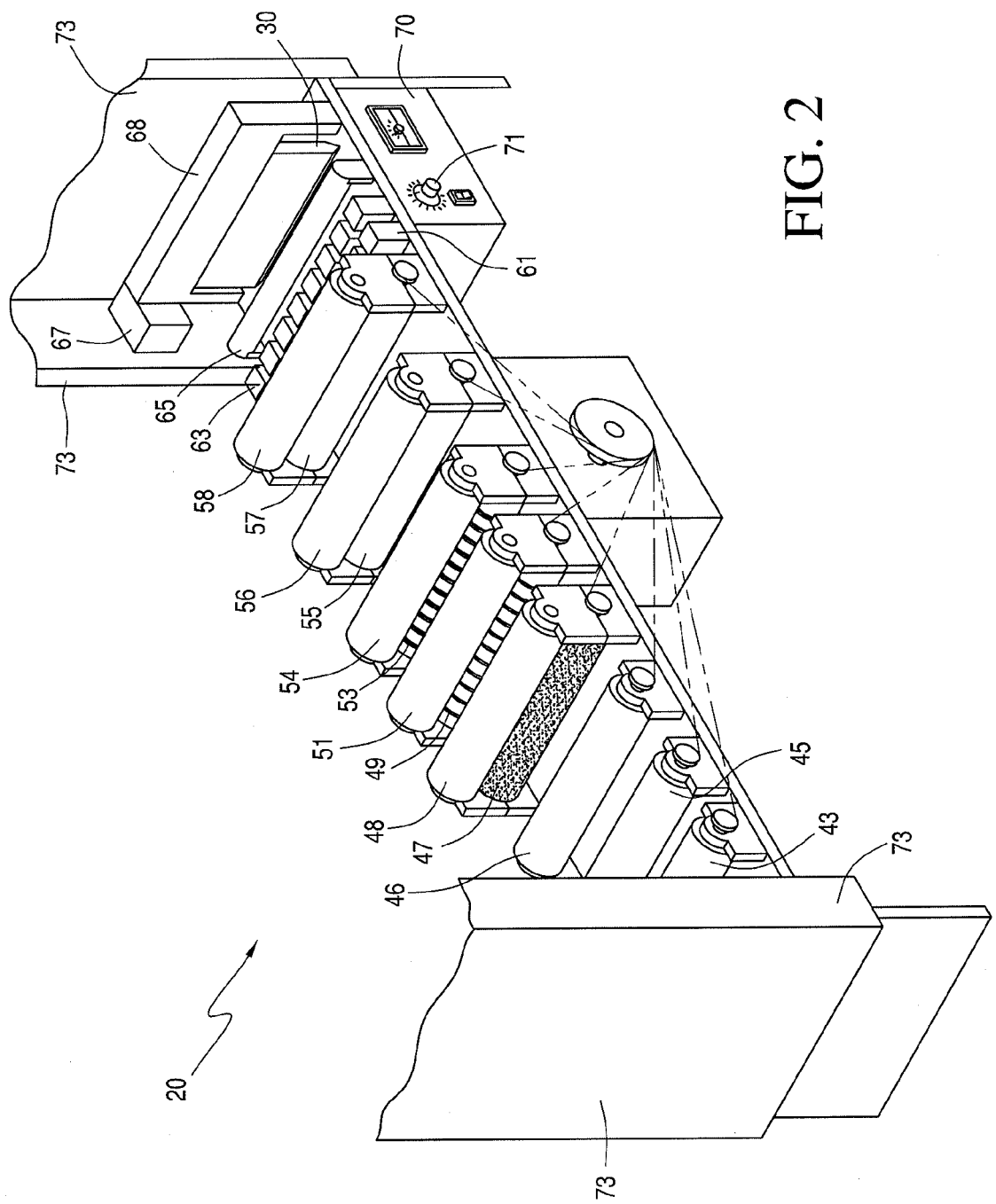
FIG. 2 is a perspective view of a machine in accordance with the first embodiment of the invention.

As illustrated in FIG. 1, the machine 20 incorporates a supply rod 41 for holding a plurality of supply spools 42 which are rotatable about the rod 41. Each strand passes under a first guide member 43 and is wrapped around a motor driven guide roller 45 that separates the strand and passes the strand under a roller 46 from where the strand is fed into the nip of a first roller set i.e., roller 47 and 48. The guide rollers 45 and 46 include the rough or textured roller 47 and smooth as for example aluminum roller 48 are operationally rotated by a central 2 hp motor (50) by belts 46.

Each of the recycled plastic strands is compressed between the rollers 47 and 48 and advanced into and through the machine 20 by the motor 50 by means of belts 46. After passing through the rollers 47 and 48 they are fed into the nip between rollers 49 and 51 which compress the strands and deform the strands by a circular die formed at about every 4 mm interval. A plurality of relatively sharp circular dies are formed on one of the two rollers to form a plurality of deformations along each strand.

A second set of rollers 53 and 54 include a compression roller and a die bearing roller and are rotated by the motor 50 by means of belts 46. However, one of the second set of rollers includes means such as a plurality of circular dies having a diameter of about 1 mm constructed and dimensioned to leave a deformation at between about 1 to 1½ mm and preferably at about every 1½ mm interval along each of the strands.

A third set of rough and small rollers 55 and 56 also act to compress the recycled plastic strand there between while one of the two rollers includes a plurality of dies around their circumference spaced about by less than 1 mm. These rollers are also rotated by motor 50 and belts 46 and produce about 1 mm indentations in each of the strands.

From the rollers 55 and 56 the recycled and deformed plastic strands are fed into a nip between rollers 57 and 58 which are heated to compress and soften each of the plastic strands. The plastic strands are then fed into a first plurality of guide members 61 and a second set of guide members 63 for positioning the strands as they are fed under a guide bar 65 and below a cutter blade. The cutter 30 or blade is activated by a separate ½ hp motor 67 by a suitable mechanism 68.

A control panel 70 includes a speed control 71 for regulating the speed of the recycled plastic strands as it passes through the machine 20. This speed control allows an operator to regulate the length of the strands so that the strands used in concrete are of different lengths.

In the preferred embodiment of the invention the deformation process takes place in three stages. For example, an interval of rough deformations where the distance between one deformation and another is about 4 mm. In a second stage an intermediate deformation the distance between one deformation and another is about 1 to 1½ mm. Finally, in a third stage a relatively smooth deformation is formed in the strands. The distance between one deformation and another is less than 1 mm.

The machine also includes a heater and a thermostat for heating the recycled plastic strands to the softening point of the plastic that is about 105° to 130° C. The control panel includes a temperature indicator and a switch to increase, decrease or maintain an indicated temperature. The control panel also includes a switch for increasing and slowing the speed of the plastic strands as well as an on/off switch to control the inverter. Finally, an on/off switch for the cutter activation by a ½ hp motor plus a master switch that is opened or closed by a safety guard that prevents persons from access to the machine when electrical power is connected if the safety guard is open.

One to four safety shields 73 are provided to protect workers from injury by shielding an individual's hands and clothing from being caught in the machinery when the machine is in operation. The mechanism for the safety shields are conventional in design and will be well understood by persons of ordinary skill in the art.

While the invention has been disclosed in connection with its preferred embodiments it should be recognized that changes and modifications may be made therein without departing from the scope of the claims.

What is claimed is:

1. A machine for deformation and cutting of recycled plastic strands as a secondary reinforcement in concrete, comprising: a multi-strand supply of recycled plastic strands and means for advancing said multi-strands into said machine, a first deformation indentation for a deformation of said strands, a second deformation indentation for further deformation of said multi-strands of recycled plastic, a third deformation indentation for spacing deformations closer together than said first and second deformation indentations, and wherein each of said first, second, and third deformation indentations include a pair of rollers with a plurality of holes in one of said pair of rollers, wherein said second deformation indentation forms circular shaped indentations each with a diameter of about 1 mm partially cut through said plastic strands, wherein said first deformation indentation forms a plurality of deformations at about every 4 mm and said second deformation indentation configured to form a plurality of deformations at about 1½ mm spacings on each recycled plastic strands, wherein said third deformation indentation configured to form a plurality of deformations at less than about 1 mm apart, and heating means for heating said recycled plastic and cutting means for cutting said heated recycled plastic strands and means for varying a speed of said advancing means to thereby control a length of said cut strands, wherein the heating means is positioned downstream of said third deformation indentation.

2. A machine for the deformation and cutting of multi-strands of recycled plastic strands wherein according to claim 1, wherein said strands are formed with a width of between about 4½ mm to 6 mm and a thickness of about 1 mm.

3. A machine for the deformation and cutting strands of recycled plastic strands according to claim 2, in which said machine includes 4 to 8 feed means for feeding 4 to 8 separate strands into said machine simultaneously.

4. A machine for the deformation and cutting strands of recycled plastic strands according to claim 2, in which said machine includes 6 feed means for feeding 6 separate strands into said machine simultaneously.

5. A machine for the deformation and cutting of multi-strands of recycled plastic strands according to claim 2, in which said machine consists of a six-strand supply of recycled plastic strands and means for simultaneously advancing said six strands into and through said machine, the first deformation indentation for the deformation of said six strands, the second deformation indentation for the further deformation of said six strands of recycled plastic and the third deformation indentation for a still further deformation of said six strands, the heating means for heating said six recycled plastic strands and the cutting means for cutting said six heated strands and control means for regulating a speed of said six strands passing through said cutting means to vary a length of said strands.

\* \* \* \* \*